Figure 1:
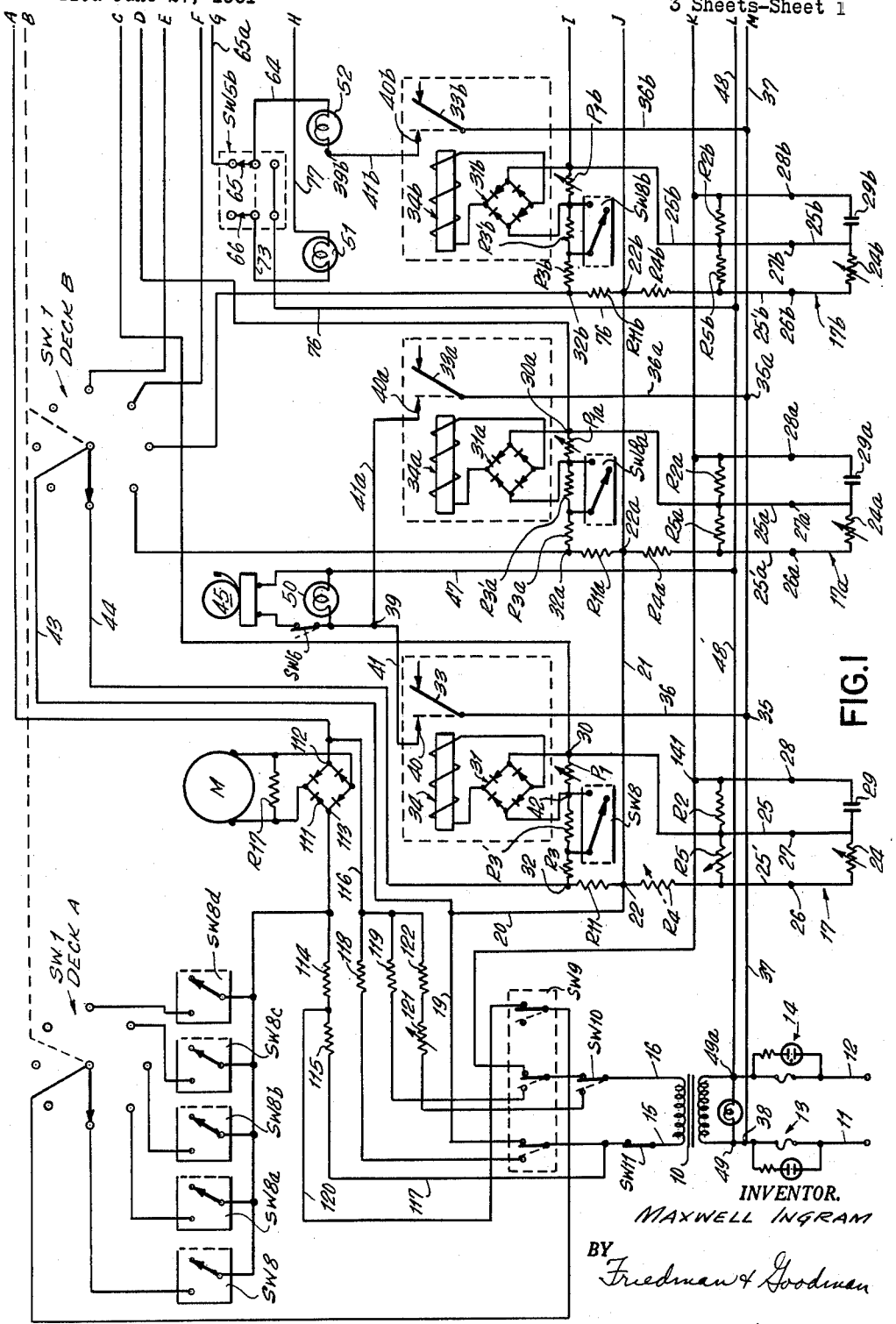

June 8, 1965

M. INGRAM 3,188,561

CONDUCTIVITY MONITORING SYSTEM

Filed June 27, 1961

3 Sheets-Sheet 1

INVENTOR.
MAXWELL INGRAM
BY Friedman & Goodman
ATTORNEYS

INVENTOR.
MAXWELL INGRAM
BY
Friedman & Goodman
ATTORNEYS

June 8, 1965  M. INGRAM  3,188,561
CONDUCTIVITY MONITORING SYSTEM
Filed June 27, 1961  3 Sheets-Sheet 3

$Rt$ = THERMISTOR
$Ra = R4 + Rt = R4$ IN SERIES WITH $Rt$
$Rb = R5$ IN PARALLEL WITH $Rt$
$Re = R4 + \dfrac{R5 \times Rt}{R5 + Rt}$
$Re$ = RESULTANT CURVE INVENTOR.
MAXWELL INGRAM
BY
Friedman & Goodman
ATTORNEYS

United States Patent Office 3,188,561
Patented June 8, 1965

3,188,561
CONDUCTIVITY MONITORING SYSTEM
Maxwell Ingram, 15 Hamilton Ave., Dumont, N.J.
Filed June 27, 1961, Ser. No. 119,866
5 Claims. (Cl. 324—30)

This invention relates to a conductivity monitoring system and more particularly to a monitoring system to be applied for monitoring variations in ionic concentration of an aqueous solution.

In many applications, it is essential that the ionic concentrations of impurities within an aqueous system be under constant surveillance and to provide instant alarming in the event that certain predetermined concentration limits are exceeded. An example of a particular application in which such monitoring arrangement is essential, is to be found in aqueous solution plants, water purifying systems, steam generating plants, nuclear steam generating plants and steam stationary or mobile generating plants such as used for ship propulsion. In applications of this character, it is deemed essential that the system be kept under continuous watchfulness in order to detect the degree of contamination. In many steam and water systems, it is essential that impurities of a very low order may be immediately detected so that remedial steps can be intiated to avoid significant damage to the equipment, etc. An example of where a low order of ionic concentration which must be detected in contemporary equipment is a nuclear reactor plant. In such plants, it is common practice to produce steam in connection with turbine arrangements. The water utilized in generating the steam must be discarded if an ionic contaminant as low as one part per million appears. The presence of chloride concentrations of even such low order may present radioactive hazards to personnel and equipment. It is imperative, therefore, that the monitoring equipment provide effective, dependable and precise continuous sampling at all points at which such concentration may develop and that arrangements for attracting the attention of operating personnel to initiate remedial steps without delay. In addition to providing for constant indication of chloride concentration and alarming in the event that the predetermined levels of concentration are exceeded, the monitoring equipment should provide for automatic dumping of the contaminated fluids without the delay attendant upon intervention of personnel. Some methods have been suggested for providing surveillance of this type; however, these systems have proved to be far inadequate for the low level concentrates required to be detected and in view of the variable factors for which such equipment must compensate in order to provide the requisite degree of precision.

It is therefore an object of this invention to provide an instrument in which the indicated or recorded readings of the ionic concentration of the monitored solution are accurate over the full scale of the indicating device and are independent of temperature variations in the monitored fluid through the range of at least 35° F. to 350° F. under continuous usage.

Another object of this invention is to provide a monitoring system of the character indicated wherein an alarm system is provided which operates with an accuracy equal to the indicated or recorded meter readings, and unaffected by temperature variations in the fluid through the same temperature range as the readings under continuous operation.

It is also an object of this invention to provide an alarm arrangement within the system of the character indicated which may be readily and precisely pre-set manually for activation at specific ion concentrations by the simple adjustment to a dial. It is a significant object of this invention that when setting the alarm it is accomplished without affecting the accuracy or readings of the metering system. The invention also has for its object the provision of meter readings on a logarithmic (expanded) scale.

It is a further object of this invention to provide an arrangement wherein stability of operation is achieved, particularly with reference to relay operations for actuating the alarming and dumping arrangements of the system, the associated relay circuit being such as to permit the ready replacement and correction of relays having operating characteristics different but within commercial tolerances, without disturbing the over-all accuracy and stability of the system.

It is also an object of this invention to provide for visual and audible alarm arrangements associated with a plurality of monitoring stations wherein the alarm conditions at any one location will not affect the monitoring capacity of the remaining locations without the necessity of complicated circuitry, thereby permitting the entire system to be constantly monitored while remedial action is taken at any particular monitoring location.

It is an additional object of this invention to provide an arrangement wherein readings upon an alarm adjusting dial arrangement, as well as readings upon the metering system are provided against an expanded logarithmic scale thereby materially increasing the accuracy with which the system may be read and operated over the magnified and working portion of the dial.

This system also has for its object the provision of means (a cell dummy load) for enabling the operator to test the overall operating conditions of the system and setting alarms under automatic temperature compensation with a minimum of disturbance thereto without utilizing any extraneous test equipment.

It is also among the objects of this invention to provide a system wherein means are provided for accurately compensating or balancing out temperature effects upon the conductivity of the solution under test by means of commercially available thermistor units which may have different characteristics from variations within commercial tolerances and corrected by an auxiliary resistive network circuit.

It is also a significant object of this invention to provide a switch arrangement in each cell location whereby a plurality of ranges of operation are made instantaneously available at will without the necessity for changing the sensing cell units.

It is also an object of this invention to provide a simple rotary selector switch arrangement and associated circuit to permit an instantaneous reading to be made of the condition at any monitoring cell location without disturbing the supervisory alarming of the system with respect to the other monitoring locations and thus provides for uninterrupted surveillance during meter reading operations, regardless of the switch position.

It is a further object of this invention to provide a system operating at low voltage and current densities thus avoiding shock hazards and the deleterious effects of high voltage and current concentrations at the monitoring cell locations and in the associated circuitry.

Other and further objects of the present invention will become apparent from the following description as read in connection with the accompanying drawing.

Figure 1A:
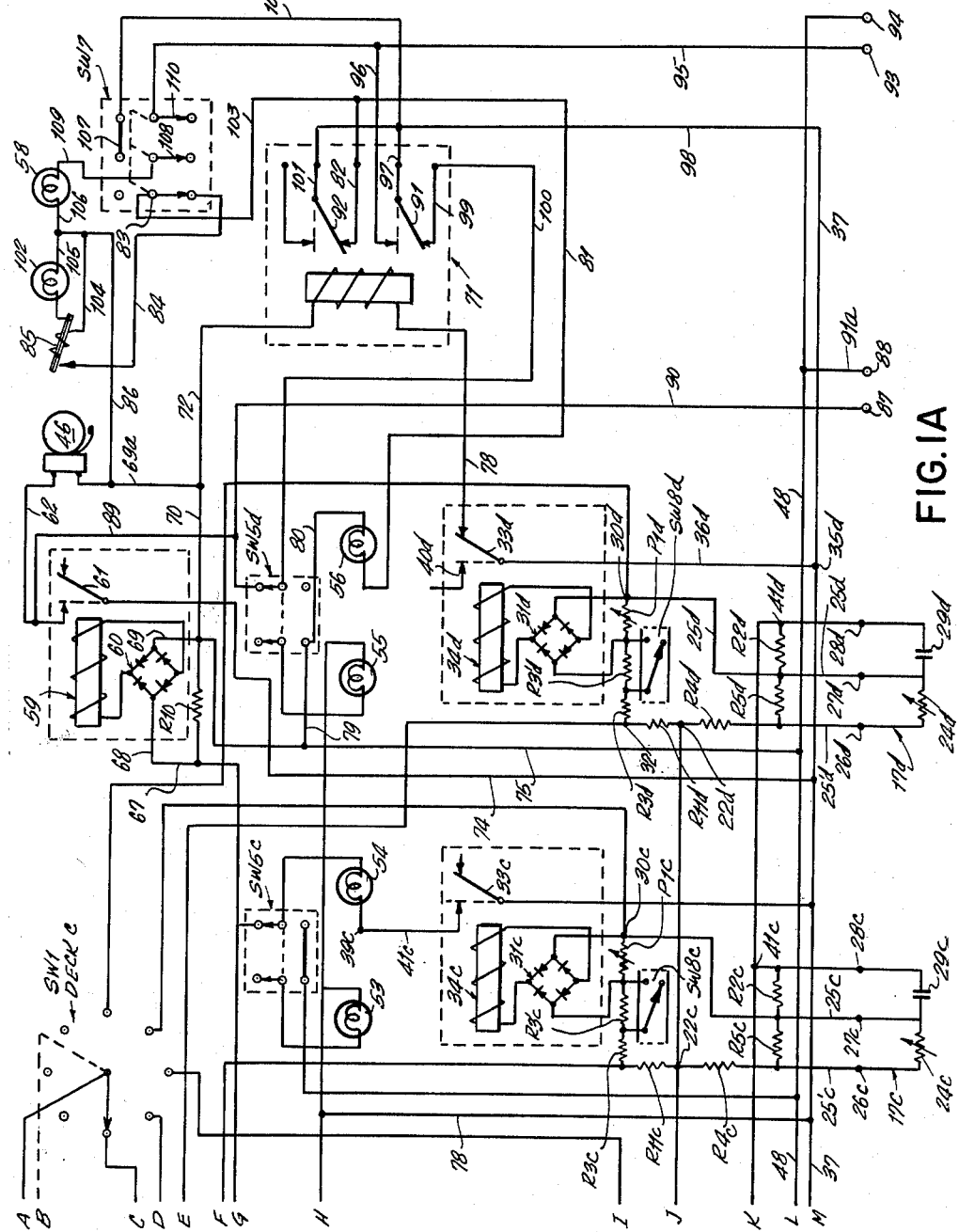
Figure 2:
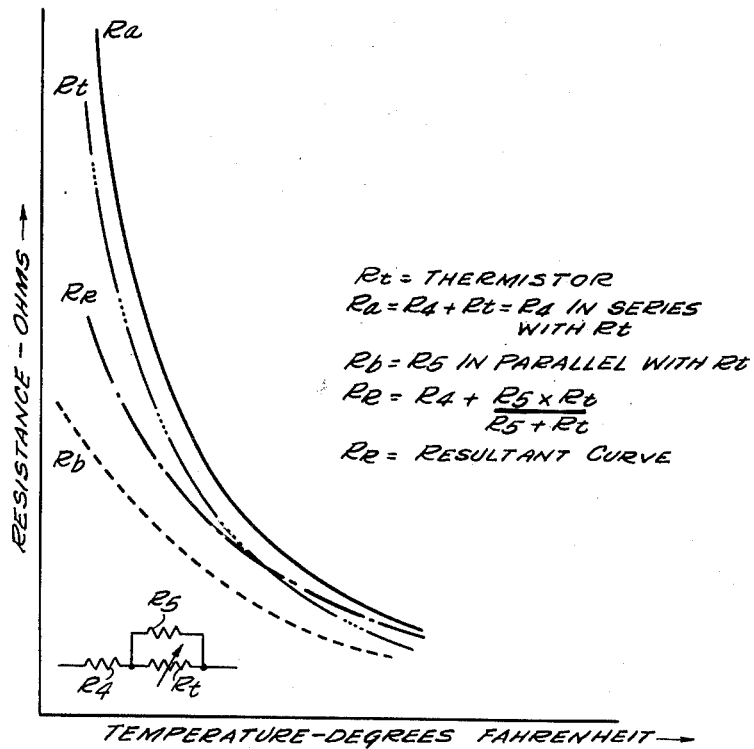
Figure 3:
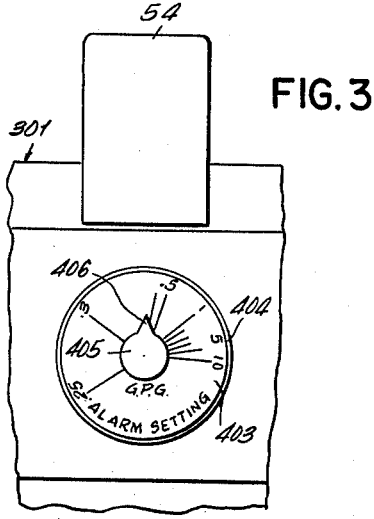
Figure 4:
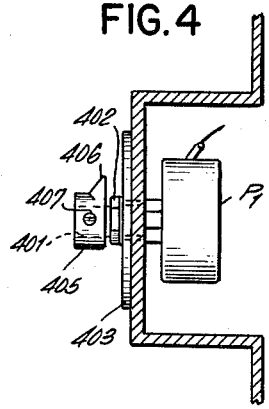

In the drawing:

FIGURES 1 and 1A comprise basic circuit diagrams of the instant circuit arrangement;

FIGURE 2 comprises a graph illustrating the effect of the corrective network with respect to the thermistor response characteristics;

FIGURE 3 is a fragmentary elevational view of the relay setting sub-panel arrangement; and FIGURE 4 is a cross-section of FIGURE 3 taken along line 4—4 thereof.

In its general aspect, the instant invention contemplates the employment of a plurality of conductivity cells immersed at various points in a fluid system to be monitored and controlled. Each such cell comprises a pair of spaced electrodes which are in contact with the fluid to be monitored and are connected to a suitable source of electric current so that variations in the electrical resistance of the fluid affect the flow of current between the electrodes. A conductivity cell of this character also includes temperature compensating means in the form of a resistance element having a negative temperature co-efficient such as a thermistor, in parallel with the meter circuit and in series with the cell electrodes, in order to accurately compensate for variations in the conductivity of the fluid due to temperature effects as distinguished from salinity effects.

Further compensation and correction of the conductivity cells is provided by the instant invention by means of associated circuitry. A source of electrical power is provided for actuating the monitoring alarm and relay devices and the conductivity cell is interposed in the flow path of current from such power source to these devices so as to produce differences in current responsive to differences in degree of salinity of the fluid system whereby the monitoring and control devices are actuated. In the instant system, power is fed from a suitable source, not shown, into the primary winding of a constant voltage isolating transformer 10. The transformer 10 maintains the secondary voltage at a constant level regardless of normal load variations which may occur in the system, as well as variations in the input voltage to the primary winding of the transformer. Transformers of this type are commercially available which will provide for constant voltage output in spite of variations in input voltage between 75–140 volts. The leads 11 and 12 to the primary windings advantageously have interposed in series safety devices, such as blown fuse indicators, designated by the numerals 13 and 14, which serve to protect the electrical system and to bring malfunctions in the form of excessive current drain to the attention of the operator immediately. The secondary winding of the transformer 10 is provided with conductors 15 and 16 which feed power to the cells, relay and meter circuits.

In the circuit illustrated in FIGURE 1, a system employing five conductivity cells is illustrated. However, it will be understood that the instant invention is not limited to the employment of such number of cells and that the inventive features herein to be described may be employed in connection with a single or any number of conductivity cell units. The conductivity cells are designated generally by the numerals 17, 17a, 17b, 17c and 17d and have similar cell constant characteristics. Each of the cells is provided with an associated monitoring circuit network. The circuit networks associated with each of the cells are similar to each other and consequently, the description of said circuits will be largely limited to cell 17, it being understood that the description of the arrangement and function of the circuit components is equally applicable to the remaining cells in which similar identifying reference numerals are used with the addition of a lower case letter suffix to identify the particular cell circuit network with which the component is associated. It will also be understood that the number of cells may be varied in accordance with the requirements of a particular application and that it is a feature of this invention that said variations may be readily and efficiently accomplished.

Lead 15 from the secondary winding of transformer 10 is connected to each of the conductivity cells through conductors 19, 20 and 21 feeding into the cell circuit networks at terminals 22, 22a, 22b, 22c and 22d respectively. The resistor R4 at terminal 22 is in series with the cell thermistor 24 and, as will more particularly appear hereafter, R4 functions to compensate for variations in thermistor characteristics in order to produce the degree of accuracy in meter readings and alarming required in the instant system. The value of R4 may be determined by test or it may be calculated by reference to the temperature resistance curve of the thermistor, as will be more particularly described in connection with FIG. 3. Additional correction of the temperature resistance characteristics of the thermistor is achieved by means of R5, which is connected in parallel with the thermistor 24 through conductors 25 and 25' and terminals 26 and 27 of the cell. The effect of resistor R4 and R5 upon the temperature resistance curve of the thermistor is shown in FIGURE 3. Resistors R4 and R5 may be of the fixed type within the required tolerances. However, if provision is made for precise substitution of thermistors in the cell, R4 and R5 should be made variable so as to permit appropriate compensation to be made for substituted thermistors having a different temperature resistance curve.

It is well understood in the art that the resistance of a fluid, such as water, will vary with the magnitude of concentration of dissolved and undissolved chlorides. However, the resistance characteristics of the solution will also be affected by its temperature thereof, the resistance decreasing with the increase of temperature. Since a system such as is herein involved must be unaffected by variations in the fluid temperature encountered, it is essential that the sensing element, in this case the conductivity cell, be electrically compensated for variations due to temperature change in order that the output thereof be a true indication of the ionic or chloride concentration. In order to accomplish this, a temperature responsive resistor or thermistor 24, having a negative temperature co-efficient has heretofore been interposed in series circuit with the electrodes 29 of the conductivity cell and the physical arrangement is such that said thermistor 24 is in physical proximity to said electrodes and is simultaneously subjected to the temperature of the solution under test. The thermistor 24 and electrodes 29 may be physically contained in a single cell or probe unit. However, it has been found that the temperature response characteristics of a thermistor element do not necessarily correspond to the change in resistivity caused in the fluid under test due to temperature changes. The thermistor curve does not approximate that of the solution under the operating temperature encountered and consequently cannot compensate thereof in and of itself.

The network comprising the series parallel arrangement of R4 with the thermistor 24 shunted by R5 provides a means of compensation in order to achieve precise meter readings and alarming. Thus, as may be seen from FIGURE 3, the curve Rt represents the variations of the resistance of the only thermistor element with temperature changes. The curve RR represents a temperature resistance curve which would provide the required correction for changes in resistivity of the fluid under test due to temperature in order to produce readings of the desired accuracy. With the incorporation of the resistor R4 in series with the thermistor Rt, it has been found that the curve Rt is shifted to the right without any substantial change in the inclination thereof, as indicated by the curve Ra. On the other hand, if the thermistor Rt is shunted by a resistance R5, the curve is shifted to the left with some change in the inclination as indicated by the curve Rb. The curve RR represents the correction achieved by the incorporation of the series parallel network and this combination provides compensation for the variations in fluid resistance referred to above through the range of operating temperatures to the required degree of accuracy. The range of operating temperatures for which such compensation is required may be from 35 to 350 degrees F. and higher. The curve Rr is not characteristic of any particular solution for which correction is to be made, but represents the relative compensating changes of resistance due to temperature changes, required to produce the desired meter and alarm accuracy in the instant system.

The resistor R2 which is shunted across the terminals 27 and 28 of the cell electrodes is a fixed resistor of very high resistance which functions to cause the pointer of meter M to read slightly upscale—i.e., above meter zero, with infinite resistance between the cell electrodes as when no solution is present. However, when the power is "off" to the meter, the pointer will fall below and completely off the salinity scale to meter zero as distinguished from salinity zero. This arrangement provides a safety factor in distinction that, in the event of a power interruption to the meter, or when meter is "off," the operator will not confuse the meter zero reading with a reading of zero salinity. As will more clearly appear hereafter, for meter calibration, the meter pointer is set to meter zero when power is off.

The meter M indicates a current developed in the monitoring circuit between the terminal 22 and 30. The monitoring circuit is further provided with a relay 34 having a relay coil energized from across the full wave rectifier 31. This rectifier network is fed by alternating current passing through the cell electrodes and appearing at terminals 30 and 32. The relay armature 33 is energized from the primary power source. The relay armature 33 is advantageously connected through lead 36 to terminal 35 and conductor 37 which is in turn connected to the transformer primary terminals at 38. The terminal 39 is connected to the normally open contact 40 through lead 41 and provides relay controlled power to any alarm or indicating device connected thereto as will more particularly appear hereafter. It will thus be apparent that each conductivity probe or cell is connected to its associated monitoring circuit network at terminals 26, 27 and 28. The associated monitoring circuit is defined by terminal points 30, 32 and 22. Power from the transformer secondary is fed to the monitoring circuit through terminals 32, 22 and 30. The control output of the monitoring circuit is developed across terminals 32 and 30 for metering purposes and across terminals 42 and 30 for alarm operating purposes. Terminal 39 provides relay controlled power for alarm or accessory circuits and device. Each monitoring circuit is provided with an individual relay 34. However, a single meter unit M is utilized for all cells in conjunction with a selector switch SW1 for selecting the particular monitoring circuit desired to be read by the meter; however, each cell may, if desired, be provided with its individual meter and/or an individual reading switch. The selector switch SW1 advantageously comprises a three-deck rotary unit provided with a contact position for each of cells 17, 17a, 17b, 17c and 17d respectively or more as well as an "off" position.

The monitoring circuit includes resistor R11, which is active in the circuit only when the meter M is not in its corresponding circuit. When the meter is in the cell circuit, for example, cell 17 position, then the rotary selector switch section SW1 (deck B) shorts out the resistor R11 through conductors 20, 43 and 44. Conductor 20 is in the common circuit to all of the resistors, R11 through conductor 21. The selector switch has a common shaft for the three decks to insure alignment of meter position to each resistor R11, R11a, R11b, R11c, R11d. Resistor R11 does not substitute directly for meter. When the meter is removed from the circuit and if R11 were not included, the voltage across the relay circuit R3 and R3′ with potentiometer P1 is increased due to the reduced loading, this would cause the relay to operate prematurely. The resistance value of resistor R11 is selected so that it reduces the current through the relay coil to the same magnitude as to when the meter is in the circuit and SW1 no longer shorts out R11. This results in accurate relay operation at all times. Resistors R3 and R3′ are current limiting resistors interposed in the relay circuit to obtain the correct relay operating current.

Potentiometer P1 is a variable resistor placed in parallel across the relay and determines the operating point thereof. This variable resistor advantageously may have a linear taper. By placing the potentiometer P1 in parallel with the input to relay rectifier 31, a number of important features of this invention are realized. Greater operating stability for obtaining the same point of relay operation under repeat conditions is achieved. The error in meter readings caused by varying potentiometer P1 for a new relay operating (alarm setting) position over its full scale is eliminated or reduced to an insignificant value. For example, if P1 were in series with the relay, the error by varying the resistor may well be higher than 3% of a meter reading, whereas, with this method, the maximum error is less than ½ percent. Additionally and advantageously, a logarithmic expanded scale calibration is achieved for more precise relay and alarm setting operation and dial calibration. This scale is similar to the meter scale, which is also logarithmic. This arrangement also permits, by turning the knob fully clockwise, the relay and consequently the alarm to be shut off temporarily to allow the other positions to function with the alarm until the fault is corrected.

Instrument rectifier 31 is a full wave rectifier which operates a sensitive D.C. relay 34. When the relay operates at its preset value as determined by the position of P1, the current to the bell circuit is completed through terminal 35 and conductors 37, 36, the relay armature 33, contact point 40 and conductor 41 through the alarm bell 45 windings and conductor 47 to conductor 48 and terminal 49a. This rings the alarm bell 45 and lights indicator lamp 50, both of which persist until the saline concentration is reduced to below the alarm point. Where this may take an extended time, switch SW6 is provided to disconnect the bell only. This method of alarm circuitry is simple and is used when one lamp indication is satisfactory for all cell alarms. However, cell positions 17b, 17c and 17d have an alarm circuit in which each cell condition and alarm cutout switch position is indicated by an indicating lamp associated therewith.

R3′ comprises a section of R3 which is selectively shorted out by one section of switch SW8 to change the operating range of the relay. As will be hereinafter noted, the other section of the switch SW8′ provides for a simultaneous similar change of range to be accomplished for the meter circuit.

The alarm circuit for conductivity cell 17a is shared with conductivity cell 17 utilizing the common alarm bell 45 and indicator lamp 50. This arrangement partakes of the limitation that when one conductivity cell causes the alarm bell and indicator lamp to operate, the function of the alarm of the other conductivity cell will be temporarily suspended since no additional alarm indication would be available therefrom. The alarm arrangement for conductivity cells 17b, 17c and 17d illustrates an arrangement for overcoming this difficulty while utilizing a single alarm bell. The alarm bell may thus be of substantial size and acoustical volume so as to assure the immediate attention of the operator in the event that alarm indication is given. In the alarm circuit arrangements for these latter conductivity cells, the operation of the alarm in connection with any particular cell location will give an indication as to the particular conductivity cell involved while sounding the common alarm bell. Since it may take some time before a salinity condition is corrected, during which the continued rigging of the alarm bell would be undesirable, an alarm cutout switch SW5b, SW5c and SW5d is provided for the conductivity cells 17b, 17c and 17d respectively. In view of the common circuit arrangement, particular reference will be made to the circuit arrangement for cell 17b. It will be noted that the lead 41b from contact 40b of the relay 34b is connected to terminal 39b of lamp 52, which is placed in series with one of the switch poles of switch SW5b through lead 64. The switch SW5b is shown in normal stand-by or "bell-in" position whereby the switch pole 65 makes contact to conductor 66 which is in turn connected at terminal 67 to lead 68 which makes connection with the full wave rectifier 60. The other input connection to rectifier 60 is made through lead 69 so that said rectifier is placed in parallel circuit relation with resistor R10. Thus, the operation of the common alarm relay 59 is dependent upon the voltage developed across resistor R10 in series with indicating lamp 52, which, in turn, is fed A.C. power from the transformer through conductor 37 and lead 36b. Current is also fed in this circuit to one side of the coil of alarm bell 46 through conductors 69a and 70 and to the other side of the power through conductors 75, 48 to terminal 49a. The other pole 65a of switch SW5b is open when the switch is in stand-by or "bell-in" position, so that lamp 51 connected thereto by lead 73 is not illuminated with the switch in this position. Lamp 51 is intended to be illuminated only when the alarm cutout switch SW5b has been moved to its alternate position in which position it indicates that the audible alarm has been silenced and that the particular conductivity cell audible alarm is presently inoperative until the salinity condition has been corrected. Lamp 52, on the other hand, is illuminated as soon as the salinity at the location of the probe portion of the cell associated therewith has reached the alarm point whereupon the operation of relay 34b causing armature 33b to engage with contact 40b and causes the lamp 52 to be illuminated and simultaneously the current flow causes a voltage drop to be developed across resistor R10 sufficient to operate armature 61 in common alarm relay 59. The closing of armature 61 alarm relay causes the alarm bell to sound as current is fed from the power source at the transformer primary through conductor 37 and lead 74 to the armature 61 and lead 63 of the bell, the circuit being completed through leads 69a, 70 and 75, which is in turn connected with the conductor 48 at the transformer primary terminal 49a.

It will be apparent from the foregoing that as the alarm condition is reached, lamp 52 is illuminated and alarm bell 46 sounds. At this point, the operator may silence the alarm bell by moving cutout switch SW5b to its alternate or cutout position wherein the circuit to the alarm through pole 65 and lead 66 is broken thereby silencing the bell. Lamp 52 is simultaneously connected to an alternate source of power through lead 76 to conductor 48. Thus, although the alarm bell will have been silenced, the indicator alarm lamp 52 will continue to indicate a condition of excessive salinity in this particular cell location. Furthermore, by moving switch SW5b to its downward or cutout position, the cutout indicating lamp 51 will be illuminated through the connection formed between lead 73 and 76 to conductor 48, the other terminal of lamp 51 being supplied through lead 77 and 78 connected to conductor 37. Lamp 51 will thereby indicate that conductivity cell 17b is in alarm indicating position and that the bell has been silenced.

As heretofore indicated, the circuit arrangement is such that the alarm indication caused by cell 17b does not provide backfeed to other lamp circuits and will not interfere with the continued operation of the remaining cells, in this case, cells 17c and 17d and that these latter cells will continue to monitor their respective locations and will give alarm bell indication in case of the development of a dangerous condition. In this connection, it must be pointed out that when switch SW5b is moved to its cutout position, the circuit to the relay coil of the common alarm relay 59 is broken causing the armature 61 to open its contact interrupting the current to the alarm bell. Thus, the closing of the armature of either relay 34c or 34d will again close the circuit to the coil of common relay 59 thereby causing the alarm bell to give an indication when the armature 61 is actuated. Thus, if a dangerous condition should develop in the location of the probe of conductivity cell 17c while the salinity condition of cell 17b is being corrected, the closing of armature 33c will provide a connection at the primary of the power transformer through conductor 37 to lead 36c through the armature 33c, lead 41c, lamp 54 and its lead to switch SW5c, and thence through conductor 66 to the relay coil circuit, as heretofore indicated, causing the alarm bell 46 to sound. Again, similar considerations apply to cell 17d. Each of the cells is therefore at all times in a condition to give appropriate alarm indications regardless of the condition of any other cell. The monitoring action thus continues without interruption even in the course of correction of the salinity condition at any cell probe location. Terminals 87 and 88 are provided in order to permit the connection of additional alarm devices at remote locations. Thus, current is supplied to terminal 87 through leads 89 and 90 whenever the bell 46 is actuated, the circuit being completed through terminal 88 in lead 91a connected to conductor 48.

It will be noted that the input to rectifier 60 of common alarm relay 59 is connected in parallel circuit relation with the resistor R10, which, in turn, is in series with the indicator lamps 52, 54 and 56 of the conductivity cells. Consequently, the flow of current is directed so that feedback operation of the unactuated indicator lamps in the group 52, 54 and 56 is presented in view of the current limitation effected by the lamp filaments and the low value resistor R10. The current through one lamp develops a voltage drop across this resistor sufficient to actuate the coil of the relay 59. Where two or more lamps are lighted, the alarm relay 59 remains closed and alarming but with a higher voltage across R10 equal to the aggregate of lamp currents.

The conductivity cell 17d is illustrated in additional association with a dumping relay arrangement. By means of this arrangement, a solenoid operated dumping valve is activated when the salinity at the probe location of the cell exceeds the safe limits. The dumping operation of the relay is under the control of the cell relay 34d. It will be borne in mind that the entire circuit is shown in unenergized condition. With the circuit energized and the salt concentration at the probe location below the alarm point, the coil of dumping relay 71 is energized through conductor 78, armature contact 33d, lead 36d and connection 35d and conductor 37 on one side and lead 72, 70, 75 and conductor 48 on the other. Consequently, the relay armatures 91 and 92 are normally in the dotted line positions. In this position, power is supplied to dumping solenoid valve terminals 93 and 94 so that the dumping valve (not shown) is maintained in closed condition. Power is supplied to terminal 94 from one side of the transformer primary through conductor 48 and from the other side of the transformer primary lead through conductor 37 and leads 98 and 97 through armature contact 91 (which is in its dotted line position) to leads 96 and 95 to terminal 93. By means of this arrangement, a factor of safety is introduced since any cause of interruption of power to the dumping valve through terminals 93 and 94 will cause the valve to open and the water to be dumped. Thus, a general power failure or the failure of the coil in relay 71 will immediately result in water being dumped and thus prevent unmonitored operation which might cause costly or extensive damages.

When the salt content at the location of the probe of cell 17d exceeds the alarm limits to armature 33d opens and move to its dotted line position, thereby opening the circuit to the coil of relay 71 and causing the armature contacts to resume their position as illustrated in full lines. Lamp 56 is thus illuminated through the circuit established from conductor 37, leads 88 and 101, through armature contact 92, leads 82 and 81 to alarm indicating lamp 56, through the lamp to leads 80 and 79, thence through lead 75 to conductor 48 and the power source. Simultaneously, the alarm bell 46 will sound, power being supplied from the power source through conductor 37, leads 98 and 97 through armature contact 91 to leads 99 and 100 to the upper right-hand contact on switch SW5d and thence to one bell terminal through leads 89 and 62. The other bell terminal is connected to leads 69a, 70 and 75 to conductor 48 and the other side of the power source. The power to the solenoid dumping valve is also interrupted thereby causing the dumping valve to open and removing the contaminated liquid from the equipment. The interruption of the current to the solenoid operated dumping valve occurs when the armature contact 91 breaks contact to leads 96, 95 and terminal 93 upon the release of relay 71.

It has also been found desirable to provide a visual indication of the operation of the dumping valve. This is accomplished by means of indicator lamp 102. Said lamp is connected in series with a thermal flasher element 85 so as to give a more prominent visual indication of the dumping condition. With the dumping relay 71 in the position indicated by the full lines as a result of the opening of the armature contact 33d due to excessive salinity at the electrodes 29d, power is supplied to dumping indicator lamp 102 from the power source through conductor 37, leads 98 and 101, armature contact 92, leads 82 and 103, through pole 83 of switch SW7 to lead 84 and to the thermal flasher 85 and lamp 102. The other side of the flasher and lamp is connected through leads 105 and 104 to leads 86, 69 and 75 to conductor 48 and the other side of the power source. It will be apparent that in view of the defective condition of monitor equipment, the dumping arrangements will continue to dump acceptable water repeatedly which may be costly and unnecessary. In order to halt the dumping operation when desired while performing repairs or for the purposes, a manually operated by-pass switch SW7 is provided. When said switch is moved from its position illustrated to its alternate position, it will be apparent that the circuit lead 84 dumping indicator lamp 102 is thus broken extinguishing the flashing lamp and the dump by-pass alarm indicating lamp 58 illuminated. The circuit to dump by-pass indicating lamp 58 is thus established as follows: from one side of the power source through conductor 35, leads 98 and 106, strap 107 on switch SW7, pole 108 and lead 109 to one side of lamp 58. The other side of lamp 58 is connected through leads 106, 86, 69, 70 and 75 to conductor 48 and the the other side of power source. The manual operation of the by-pass switch simultaneously supplies power to the dump valve terminals 93 and 94 so that the dump valve is actuated to closed position. Thus, with the SW7 moved to its alternate position power is supplied to terminal 93 through lead 95, pole 110 of the switch to lead 106 and thence through lead 98 to conductor 37 and one side of the power source. The dump valve terminal 94 is directly connected to conductor 48 and the other side of the power source. The disposition of the dump valve in by-passed position is indicated by lamp 58 in order to remind the operator of the necessity of changing the switch to its alternate position when the defect has been cured and a restoration of the automatic dumping action is desired.

As heretofore indicated, the current flow between the probe electrodes 29 at any position is measured by a common metering circuit associated with meter M. A three-deck selector switch SW1 permits the meter circuit to be selectively switched to any probe position desired. The meter circuit comprises a meter M which may advantageously be a milli or micro ammeter or recorder having a D'Arsonval movement. The meter is shunted by a compensating resistor R17 of high resistance value which serves to compensate for differences within manufacturing tolerances found in commercially available meters. It will be borne in mind that the entire circuit system is fed by alternating current, the passage of which through the probe electrodes is to be measured by the meter. Consequently, a full-wave meter rectifier 111 is shunted across the meter terminal in parallel with the meter compensating resistor R17. One of the input terminals of the meter rectifier 111 is connected to the movable contact of deck C of switch SW1, which in turn selectively connects the terminal 112 of the rectifier to terminal 27 connected to one electrode of 29 in the conductivity cell 17. The other terminal 113 of the rectifier is connected to the source of alternating current at the secondary transformer 10 through resistors 114 and 115 in series with each other and through conductors 117 and 15. Resistors 114 and 115 comprise current limiting resistors in series with each other so as to provide for the proper high and low range readings on the meter. When greater meter sensitivity is desired, low range readings are provided by shorting out resistor 114 to thereby reduce the meter reading range by increasing allowable current to meter for greater sensitivity. It will be noted that the low range readings may be provided for any conductivity cell position by means of the switch arrangement of deck A in switch SW1. It will be noted that the contact for each cell position on deck A of switch SW1 is associated with an individually operable double-pole switch SW8. One pole, first half section of switch SW8, permits resistor 114 to be shorted across for that particular cell position, without affecting the circuit position of the resistor 114 with respect to any other cell position. One pole of the second half section of switch SW8 simultaneously shorts across resistor R3' for that particular cell position thereby correspondingly changing the operating range of the relay 34 and increases the sensitivity of the relay operation. Consequently, the sensitivity of both the meter and the relay for any particular cell position may be changed as required depending upon the particular location of the conductivity cell probe and the localized requirements without affecting each other. Another significant advantage of the instant circuit arrangement is that conductivity cells or probe units having similar characteristics, known as cell constant, may be utilized at all probe positions and the required sensitivity adjustments for each individual dual probe position may be made at the centrally located monitoring circuit panel. It is also an advantage over the arrangement that the selection of different sensitivities is made possible while using only a single conductivity cell constant.

Switch SW9 provides a convenient arrangement for conducting periodic checks of the operating characteristics of the meter arrangement in order to assure proper meter operation and calibration at all times. Switch SW9 comprises a 3-pole double-throw switch which makes momentary contact when the switch operating member is actuated. The circuit is indicated with the switch SW9 in "meter-in" position, as would be the case during the normal operative period of the device. In order to accomplish the aforesaid operational check and calibration, the operation of the actuating member of switch SW9 is moved to its alternate dotted line position. When thus moved, it will be apparent that resistor 118 is shunted across the meter between the power source and terminal 112 of the rectifier 111 to simulate the thermistor circuit resistance while resistor 119 simultaneously provides an impedance of fixed value equivalent to the impedance of a selected mid-scale salinity between the cell electrodes. The resistance of resistor 119 is selected so as to provide a check point reading on the meter. For this purpose, an appropriate check point mark may be permanently inscribed upon the meter scale. Consequently, upon the depression of the actuating member of switch SW9, the prescribed fixed reading should appear upon the meter M if the circuit is operating properly, in order to assure that the checkpoint meter reading will always be on the high range and that resistor 114 is in proper operating condition. The switch also opens the circuit to lead 120 so that both resistors 115 and 144 are in series circuit with the meter when the test button is depressed.

A switch SW10 is also provided in circuit arrangement with lead 16 from the power source so as to permit the substitution of a variable impedance or "dummy load" in place of the impedance between the electrodes of cells 29, 29a, 29b, 29c, 29d so as to determine the operative characteristics of the circuit to be checked for varying cell impedances to be encountered in monitoring operation. The substitution of the series variable resistor 121 and fixed resistor 122 for the cell impedance, is accomplished by movement of operating contact of switch SW10 to its alternate dotted line position. In this position, power through lead 116 is fed through resistors 121 and 122 into terminal 112 of the meter rectifier while the other terminal 113 of the rectifier is connected to lead 15 of the power source through lead 117 in series with resistors 115 and 114. The resistor 121 is made variable so that the impedance may be varied as desired over the full meter scale. Resistor 122 in series with resistor 121 provides a limiting current which prevents the meter from reading off scale on the high side when the resistance of resistor 121 is reduced to zero. It will also be apparent that the "dummy load," resistors 121 and 122 merely substitute for the impedance between the electrodes of cell 29 and that the relay circuits for each cell position are responsive to the "dummy load." The position of switch SW1 will determine which cell and relay position will be operated upon when the impedance of resistor 121 is adjusted to its particular operating value. Consequently, the cell "dummy load" switch SW10 and its associated circuit actuate the overall operation of the meter and relays to be periodically checked and relays adjusted as desired so that each cell position will operate at a predetermined alarm point. It will be noted that the thermistor 24 is active at all times as it remains connected within each cell circuit so that when the adjustments are made by means of "dummy load," resistor 121, the circuit is under automatic temperature compensating conditions. Calibration of the dial of the cell "dummy load" variable resistor 121 is therefore not required in view of this constant self compensation for temperature variations.

As heretofore indicated, a relay 34 is operated whenever the alarm conditions of the associated probe or conductivity are exceeded. It should be borne in mind that the pull-in point of any relay and the drop-out point are not the same. Consequently, when the alarm point has been reached at any particular relay position, the relay will be pulled in and would normally remain in pulled-in condition due to residual magnetism and other well-known factors even after the malfunction has been corrected and the cell conductivity restored to lower than alarm conditions. To overcome this differential between the pull-in and drop-out current a switch SW11 is provided to de-energize any and all of relays 34 remaining in alarm condition after the restoration of below alarm conditions. Switch SW11 breaks the circuit from the power source lead 15 to the entire circuit and consequently causes all relays to be simultaneously de-energized and to be restored to stand-by for alarm position. Of course, if the alarm conditions at any particular probe position remains above the alarm point, the relay for that particular position will automatically close and again alarm with the closing of switch SW11 and thus assure that appropriate indication is given to the continuation of the malfunction.

As heretofore indicated, the alarm relay circuit includes variable resistor P1 which is pre-set for the particular point at which the relay will operate to actuate the alarm circuit. When it becomes necessary to change a relay, the dial calibration on the alarm setting dial may not necessarily correspond to the alarm points as theretofore preselected. Consequently, it becomes necessary to adjust the dial calibration so as to accurately expand to the actual alarm point. This is accomplished by means of the special arrangement illustrated in FIGURES 3 and 4. Said figures show a portion of the alarm sub-panel 301 upon which the relay assembly is mounted. The relay assembly includes the variable resistor or potentiometer P1 which is mounted on the subpanel by means of a locking nut 402. The potentiometer is adjusted by means of rotation of shaft 401. A dial 403 provided with expanded scale calibrations 404 is fixedly clamped in position against the panel by means of locking nut 402. Said dial may be conveniently calibrated in terms of grains per gallon or as otherwise desired. A knob 405 is received upon the shaft 401 and includes an indicating pointer 406. The knob 405 is locked against relative rotation with respect to the potentiometer shaft 401 by means of a set screw 407. Upon the substitution or replacement of a relay which has somewhat different operating characteristics, it becomes necessary to alter the angular position of the radial markings 404 with respect to the setting of pointer 406. This is accomplished as follows: The cell dummy load switch SW9 is actuated and the knob 405 is adjusted to the point at which the relay is actuated to alarm condition. The lock nut 402 is then loosened and the dial is rotated about its axis so that the calibration markings thereof correspond to the meter reading alarm point and aligns with the position of the pointer 406. The lock nut 402 is then again tightened locking the dial in position and the position of the pointer will now indicate correctly over the entire alarm setting scale. It will be noted that this arrangement permits the readings of the usually critical values to be made on the expanded portion of the calibrated scale markings.

Desirable results have been achieved with the arrangement herein described utilizing components having the following approximate values. The values given here are by way of example and are not intended as limiting characteristics.

| | |
|---|---|
| 114 | 30,000 ohms. |
| 115 | 30,000 ohms. |
| 118 | 22,000 ohms. |
| 119 | 2,000 ohms. |
| 121 | 10,000 ohms (variable). |
| 122 | 220 ohms. |
| RM | 1,000 ohms (variable). |
| R2 | 100,000 ohms. |
| R3 and R3' | 10,000 ohms. |
| R4 | 270 ohms. |
| R5 | 1 megohm. |
| R10 | 250 ohms. |
| R11 | 2,000 ohms. |
| P1 | 25,000 ohms (variable). |

The embodiment of the invention illustrated and described hereinafter has been selected for the purpose of clearly setting forth the principles involved. It will be apparent, however, that the present invention is susceptible to being modified in respect to details of construction, combination and arrangement of parts which may be resorted to without departure from the spirit and scope of the invention as claimed.

I claim:

1. An electric system for monitoring the saline content of a liquid, said system comprising a conductivity cell in thermal proximity to the liquid to be monitored, said cell including a pair of electrodes adapted to be immersed in said liquid and a temperature responsive resistor in series circuit therewith, said cell being connected to a source of alternating electric current whereby variations in the electrical resistance of the fluid affect the flow of current therethrough, a meter circuit for indicating the state of said current flow and a relay circuit for actuating an indicator when the salinity of said liquid exceeds a predetermined value, said meter and relay circuits being in parallel circuit connection with said temperature responsive resistor, said relay circuit including a relay and variable resistor, said variable resistor being connected in parallel with the relay terminals and a fixed resistor connected in series circuit with the parallel network formed by said relay and variable resistor.

2. The system in accordance with claim 1 wherein shorting means are provided for shorting out a portion of said fixed resistor in order to alter the range of operation of said relay.

3. An electric system for monitoring the saline content of a liquid, said system comprising a conductivity cell in thermal proximity to the liquid to be monitored, said cell including a pair of electrodes adapted to be immersed in said liquid and a temperature responsive resistor in series circuit therewith, said cell being connected to a source of alternating electric current whereby variations in the electrical resistance of the fluid affect the flow of current therethrough, a meter circuit for indicating the state of said current flow and a relay circuit for actuating an indicator when the salinity of said liquid exceeds a predetermined value, said meter and relay circuits each being in parallel circuit connection with said temperature responsive resistor, said relay circuit including a relay and a variable resistor, said variable resistor being connected in parallel with the relay coil terminals, said meter circuit including a pair of resistors connected in series with said meter, one of said resistors being provided with shorting means operable to alter the range of readings on said meter and simultaneously change the range of operation of the relay circuit.

4. An electric system for monitoring the saline content of a liquid, sand system comprising a conductivity cell in thermal proximity to the liquid to be monitored, said cell including a pair of electrodes adapted to be immersed in said liquid and a temperature responsive resistor in series circuit therewith, said cell being connected to a source of alternating electric current whereby variations in the electrical resistance of the fluid affect the flow of current therethrough, a meter circuit for indicating the state of said current flow and a relay circuit for actuating an indicator when the salinity of said liquid exceeds a predetermined value, said meter and relay circuits each being in parallel circuit connection with said temperature responsive resistor, said relay circuit including a relay and variable resistor and a fixed resistor connected in series circuit with a parallel network formed by said relay and variable resistor, said variable resistor being connected in parallel with the relay terminals, said variable resistor including a rotatable shaft adjusting the degree of electrical resistance presented thereby in order to predetermine the point at which said relay will be actuated, a knob fixed on said shaft, an indicating dial cooperatively associated with said knob, said dial being provided with scale markings indicating the salinity at which said relay will be actuated, means for angularly displacing said dial with respect to the knob in order to permit said scale readings to be accurately calibrated with respect to relays having differing actuation characteristics.

5. An electric system for monitoring the saline content of a liquid, said system comprising a plurality of conductivity cells each in thermal proximity to a portion of the liquid to be monitored including a cell circuit for each of said cells, each of said cells including a pair of electrodes adapted to be imersed in said liquid and a temperature responsive resistor in series circuit with said electrodes, said cells being connected to a source of alternating electric current whereby variations in the electrical resistance of the fluid affect the flow of current therethrough, a meter circuit including a meter for indicating the state of said current flow, and a relay circuit for actuating an indicator when the salinity of said liquid exceeds a predetermined value, said meter and relay circuits each being in parallel circuit connection with temperature responsive resistor, said relay circuit including a relay and a variable resistor, said variable resistor being connected in parallel with the relay coil terminal, a fixed resistor connected in series circuit with the parallel network formed by said relay and variable resistor, selector switch means for connecting said meter circuit selectively to any one of said cell circuits, said meter and relay circuit being independent of each other whereby the selected position of said selector switch for test purposes does not affect any other of said relay circuits.

References Cited by the Examiner

UNITED STATES PATENTS

| 2,277,365 | 3/42 | Michael | 324—130 |
|---|---|---|---|
| 2,363,551 | 11/44 | Roeder | 324—30 |
| 2,456,117 | 12/48 | Feller | 324—30 |
| 2,459,081 | 1/49 | Kunz | 324—130 |
| 2,565,501 | 8/51 | Ingram | 324—30 |
| 2,799,015 | 7/57 | Bell | 340—213 X |
| 2,864,999 | 12/58 | Sullivan | 324—115 X |
| 2,969,530 | 1/61 | Duncan | 340—253 |
| 3,011,162 | 11/61 | Byrnes | 340—248 |
| 3,029,379 | 4/62 | Ingram | 324—30 |
| 3,070,746 | 12/62 | Moore et al. | 324—115 X |

BENNETT G. MILLER, *Primary Examiner.*